(12) United States Patent
Furusawa

(10) Patent No.: US 7,142,547 B2
(45) Date of Patent: Nov. 28, 2006

(54) SCHEDULING DEVICE AND CELL COMMUNICATION DEVICE

(75) Inventor: Satoshi Furusawa, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1010 days.

(21) Appl. No.: 10/101,113

(22) Filed: Mar. 20, 2002

(65) Prior Publication Data

US 2002/0181469 A1    Dec. 5, 2002

(30) Foreign Application Priority Data

Jun. 5, 2001    (JP)    ............... 2001-169529

(51) Int. Cl.
*H04L 12/56*    (2006.01)
(52) U.S. Cl. .................. 370/395.4; 370/229; 370/412
(58) Field of Classification Search ................ 370/229, 370/230, 381, 382, 383, 389, 395.4, 395.7, 370/412
See application file for complete search history.

(56) References Cited

U.S. PATENT DOCUMENTS

| | | | | |
|---|---|---|---|---|
| 5,283,882 A | * | 2/1994 | Smith et al. ................ | 365/49 |
| 5,781,769 A | * | 7/1998 | Weber ........................ | 713/502 |
| 6,002,666 A | * | 12/1999 | Fukano ..................... | 370/230.1 |
| 6,597,690 B1 | * | 7/2003 | Mehta et al. ............... | 370/360 |
| 2001/0008530 A1 | * | 7/2001 | Okamoto .................... | 370/428 |

FOREIGN PATENT DOCUMENTS

| | | |
|---|---|---|
| JP | 08-242238 | 9/1996 |
| JP | 11-355304 | 12/1999 |
| JP | 2000-069020 | 3/2000 |
| JP | 2000-224173 | 8/2000 |

* cited by examiner

*Primary Examiner*—Ricky Q. Ngo
*Assistant Examiner*—Nguyen Ngo
(74) *Attorney, Agent, or Firm*—Venable LLP; Michael A. Sartori

(57) ABSTRACT

A scheduling device and a cell communication device capable of reducing a total storage region required for a scheduling function. Cell output control is performed by the scheduling function. The scheduling device includes a content addressable memory having queues for storing incoming cells. The queues have queue numbers. The queue numbers correspond to addresses of the content addressable memory. Read time for each cell is also stored in the content addressable memory. The actual time or a read time stored in a read time storage section is taken as the virtual time. The content addressable memory outputs a cell from a queue having a queue number indicated by an address, if this address has a matching address at the virtual time based on comparison conditions at the actual time and virtual time. The read time stored in the read time storage section and that in the content addressable memory are updated based on the comparison conditions at the actual time and virtual time.

10 Claims, 11 Drawing Sheets

FIG. 9

| INCOMING CELLS | | q5 | q4 | q3 | q2 | q2 | q3 | q4 | q5 | q2 |
|---|---|---|---|---|---|---|---|---|---|---|
| ACTUAL TIME | 0 | 1 | 2 | 3 | 4 | 5 | 6 | 7 | 8 | 9 | 10 |
| VIRTUAL TIME | 0 | 1 | 2 | 3 | 4 | 5 | 6 | 7 | 8 | 9 | 10 |
| OUTPUT CELLS | | q5 | q4 | q3 | q2 | | | | | |

CELL STORAGE SECTION

| | | | | | | | | | | | |
|---|---|---|---|---|---|---|---|---|---|---|---|
| NUMBER OF STORED CELLS q1 | 0 | | | | | | | | | | |
| NUMBER OF STORED CELLS q2 | 0 | | | | 0 | 1 | | | | | 2 |
| NUMBER OF STORED CELLS q3 | 0 | | | 0 | | | 1 | | | | |
| NUMBER OF STORED CELLS q4 | 0 | | 0 | | | | | | 1 | | |
| NUMBER OF STORED CELLS q5 | 0 | 0 | | | | | | | | 1 | |

CONTENT ADDRESSABLE MEMORY SECTION

| | | | | | | | | | | | | |
|---|---|---|---|---|---|---|---|---|---|---|---|---|
| q1 READ TIME | 0 | | | | | | | | | | | |
| VALIDITY FLAG | 0 | | | | | | | | | | | |
| q2 READ TIME | 0 | | | | | | 11 | 11 | | | | |
| VALIDITY FLAG | 0 | | | | | | 0 | 1 | | | | |
| q3 READ TIME | 0 | | | | 11 | | | | 11 | | | |
| VALIDITY FLAG | 0 | | | | 0 | | | | 1 | | | |
| q4 READ TIME | 0 | | | 11 | | | | | | 11 | | |
| VALIDITY FLAG | 0 | | | 0 | | | | | | 1 | | |
| q5 READ TIME | 0 | 11 | | | | | | | | 11 | | |
| VALIDITY FLAG | 0 | 0 | | | | | | | | 1 | | |

READ PERIOD STORAGE SECTION

| | | | | | | | | | | | |
|---|---|---|---|---|---|---|---|---|---|---|---|
| READ PERIOD q1 | 2.2 | | | | | | | | | | |
| CARRY VALUE | 0.0 | | | | | | | | | | |
| READ PERIOD q2 | 6.2 | | | | | | | | | | |
| CARRY VALUE | 0.0 | | | | | 0.2 | | | | | |
| READ PERIOD q3 | 7.4 | | | | | | | | | | |
| CARRY VALUE | 0.0 | | | | 0.4 | | | | | | |
| READ PERIOD q4 | 8.6 | | | | | | | | | | |
| CARRY VALUE | 0.0 | | | 0.6 | | | | | | | |
| READ PERIOD q5 | 9.8 | | | | | | | | | | |
| CARRY VALUE | 0.0 | 0.8 | | | | | | | | | |

READ TIME STORAGE SECTION

| | | | | | | | | | | | |
|---|---|---|---|---|---|---|---|---|---|---|---|
| 0 READ TIME | | | | | | | | | | | |
| COMPARISON CONDITION | | | | | | | | | | | |
| 1 READ TIME | | | | | | | | | | | |
| COMPARISON CONDITION | | | | | | | | | | | |
| 2 READ TIME | | | | | | | | | | | |
| COMPARISON CONDITION | | | | | | | | | | | |
| ... READ TIME | | | | | | | | | | | |
| COMPARISON CONDITION | | | | | | | | | | | |

FIG. 10

| INCOMING CELLS | ... | q3 | q1 | q1 | q1 | q1 | q5 | q4 | q2 | q1 | q1 |
|---|---|---|---|---|---|---|---|---|---|---|---|
| ACTUAL TIME | ... | 11 | 12 | 13 | 14 | 15 | 16 | 17 | 18 | 19 | 20 |
| VIRTUAL TIME | ... | 11 | 11 | 11 | 12 | 11 | 14 | 16 | 17 | 18 | 18 |
| OUTPUT CELLS | ... | q2 | q3 | q4 | q1 | q5 | q1 | q1 | q2 | q1 | q3 |

CELL STORAGE SECTION

| | | | | | | | | | | | |
|---|---|---|---|---|---|---|---|---|---|---|---|
| NUMBER OF STORED CELLS | q1 | ... | | 1 | 2 | 2 | 3 | 2 | 1 | | 1 | 2 |
| NUMBER OF STORED CELLS | q2 | ... | 1 | | | | | | | 1 | | |
| NUMBER OF STORED CELLS | q3 | ... | 2 | 1 | | | | | | | | 0 |
| NUMBER OF STORED CELLS | q4 | ... | | | 0 | | | | 1 | | | |
| NUMBER OF STORED CELLS | q5 | ... | | | | | 0 | 1 | | | | |

CONTENT ADDRESSABLE MEMORY SECTION

| | | | | | | | | | | | |
|---|---|---|---|---|---|---|---|---|---|---|---|
| q1 READ TIME | ... | | 12 | | 14 | | 16 | 18 | | 20 | |
| VALIDITY FLAG | ... | | 1 | | 1 | | 1 | 1 | | 1 | |
| q2 READ TIME | ... | 17 | | | | | | | 23 | | |
| VALIDITY FLAG | ... | 1 | | | | | | | 1 | | |
| q3 READ TIME | ... | 18 | | | | | | | | | 26 |
| VALIDITY FLAG | ... | 1 | | | | | | | | | 0 |
| q4 READ TIME | ... | | 20 | | | | 20 | | | | |
| VALIDITY FLAG | ... | | 0 | | | | 1 | | | | |
| q5 READ TIME | ... | | | | | 21 | 21 | | | | |
| VALIDITY FLAG | ... | | | | | 0 | 1 | | | | |

READ PERIOD STORAGE SECTION

| | | | | | | | | | | | |
|---|---|---|---|---|---|---|---|---|---|---|---|
| q1 READ PERIOD | ... | | | | | | | | | | |
| CARRY VALUE | ... | | | | 0.2 | | 0.4 | 0.6 | | 0.8 | |
| q2 READ PERIOD | ... | | | | | | | | | | |
| CARRY VALUE | ... | 0.4 | | | | | | | 0.6 | | |
| q3 READ PERIOD | ... | | | | | | | | | | |
| CARRY VALUE | ... | 0.8 | | | | | | | | | 0.2 |
| q4 READ PERIOD | ... | | | | | | | | | | |
| CARRY VALUE | ... | | 0.2 | | | | | | | | |
| q5 READ PERIOD | ... | | | | | | | | | | |
| CARRY VALUE | ... | | | | | 0.6 | | | | | |

READ TIME STORAGE SECTION

| | | | | | | | | | | | | |
|---|---|---|---|---|---|---|---|---|---|---|---|---|
| READ TIME | 0 | ... | 11 | 11 | 12 | 11 | 14 | 16 | 17 | 18 | 18 | 20 |
| COMPARISON CONDITION | | ... | 1 | 1 | 0 | 1 | 0 | 0 | 0 | 1 | 1 | 1 |
| READ TIME | 1 | ... | 12 | 11 | 14 | | | | | | | |
| COMPARISON CONDITION | | ... | 0 | 1 | 0 | | | | | | | |
| READ TIME | 2 | ... | | | | | | | | | | |
| COMPARISON CONDITION | | ... | | | | | | | | | | |
| READ TIME | ... | ... | | | | | | | | | | |
| COMPARISON CONDITION | | ... | | | | | | | | | | |

FIG. 11

| INCOMING CELLS | ... | q1 | | | | | | | | | |
|---|---|---|---|---|---|---|---|---|---|---|---|

| | | | | | | | | | | | |
|---|---|---|---|---|---|---|---|---|---|---|---|
| ACTUAL TIME | ... | 21 | 22 | 23 | 24 | 25 | 26 | 27 | 28 | 29 | 30 |
| VIRTUAL TIME | ... | 20 | 20 | 21 | 23 | 23 | 25 | 27 | 28 | 29 | 30 |

| OUTPUT CELLS | ... | | q1 | q4 | q5 | q1 | q2 | q1 | | | |
|---|---|---|---|---|---|---|---|---|---|---|---|

CELLS STORAGE SECTION

| | | | | | | | | | | | |
|---|---|---|---|---|---|---|---|---|---|---|---|
| NUMBER OF STORED CELLS q1 | | ... | 2 | | | 1 | | 0 | | | |
| NUMBER OF STORED CELLS q2 | | ... | | | | | 0 | | | | |
| NUMBER OF STORED CELLS q3 | | ... | | | | | | | | | |
| NUMBER OF STORED CELLS q4 | | ... | | 0 | | | | | | | |
| NUMBER OF STORED CELLS q5 | | ... | | | 0 | | | | | | |

CONTENT ADDRESSABLE MEMORY SECTION

| | | | | | | | | | | | |
|---|---|---|---|---|---|---|---|---|---|---|---|
| q1 | READ TIME | ... | 23 | | | 25 | | 27 | | | |
| | VALIDITY FLAG | ... | 1 | | | 1 | | 0 | | | |
| q2 | READ TIME | ... | | | | | | 29 | | | |
| | VALIDITY FLAG | ... | | | | | | 0 | | | |
| q3 | READ TIME | ... | | | | | | | | | |
| | VALIDITY FLAG | ... | | | | | | | | | |
| q4 | READ TIME | ... | | 28 | | | | | | | |
| | VALIDITY FLAG | ... | | 0 | | | | | | | |
| q5 | READ TIME | ... | | | 31 | | | | | | |
| | VALIDITY FLAG | ... | | | 0 | | | | | | |

READ PERIOD STORAGE SECTION

| | | | | | | | | | | | |
|---|---|---|---|---|---|---|---|---|---|---|---|
| q1 | READ PERIOD | ... | | | | | | | | | |
| | CARRY VALUE | ... | 0.0 | | | 0.2 | | 0.4 | | | |
| q2 | READ PERIOD | ... | | | | | | | | | |
| | CARRY VALUE | ... | | | | | | 0.8 | | | |
| q3 | READ PERIOD | ... | | | | | | | | | |
| | CARRY VALUE | ... | | | | | | | | | |
| q4 | READ PERIOD | ... | | | | | | | | | |
| | CARRY VALUE | ... | | 0.8 | | | | | | | |
| q5 | READ PERIOD | ... | | | | | | | | | |
| | CARRY VALUE | ... | | | 0.4 | | | | | | |

READ TIME STORAGE SECTION

| | | | | | | | | | | | |
|---|---|---|---|---|---|---|---|---|---|---|---|
| 0 | READ TIME | ... | 20 | 21 | 23 | 23 | 25 | | | | |
| | COMPARISON CONDITION | ... | 1 | 0 | 1 | 1 | 0 | | | | |
| 1 | READ TIME | ... | 21 | | | | | | | | |
| | COMPARISON CONDITION | ... | 0 | | | | | | | | |
| 2 | READ TIME | ... | | | | | | | | | |
| | COMPARISON CONDITION | ... | | | | | | | | | |
| ... | READ TIME | ... | | | | | | | | | |
| | COMPARISON CONDITION | ... | | | | | | | | | |

SCHEDULING DEVICE AND CELL COMMUNICATION DEVICE

BACKGROUND OF THE INVENTION

1. Field of the Invention

The present invention relates to a scheduling device and cell communication device. In ATM communication, for example, the present invention can be applied to a scheduling device in which cell output control is performed for each individual service class or connection and to an ATM node device provided with such scheduling device.

2. Description of the Related Art

An ATM communication system is a system in which processing of voice, images, data, or various other types of service information is performed in integrated fashion. Performing such multiple tasks creates a problem of interference of bands of use between different services.

In the ITU-T Recommendations made by the ITU-TS (International Telecommunication Union Telecommunication Standardization Sector), ATCs (ATM Transfer Capabilities) known as DBR (deterministic bit rate), SBR (statistical bit rate), ABR (available bit rate), UBR (unspecified bit rate) and GFR (guaranteed frame rate) are standardized (defined) in accordance with the traffic characteristics of the service. Also, the service classes (QoS) known as class 1, class 2, class 3 and U class are standardized in accordance with service quality such as the cell loss rate and cell delay variation. Consequently, in an ATM communication network, interference of bands of use occurs between respective ATC/QoS.

In order to avoid such band interference, ATM node devices are provided with a scheduling device located between ATC/QoS or between connections and cell reading is performed in accordance with the schedule determined by the scheduling device.

Conventional scheduling devices usually avoid the band interference by providing a cell buffer for each ATC/QoS or for each connection and performing the cell reading at specified intervals. Various designs and schemes have been developed for such cell buffer and scheduling. For example, Japanese Patent Kokai No. 11-355304 discloses a scheduling device that has a timing table for each QoS such that reading of cells from a cell buffer is performed in accordance with this timing table, and the timing table is updated when the cell reading takes place.

FIG. 2 of the accompanying drawings shows a timing table used by a conventional scheduling device. As shown in this drawing, the timing table has binary information storage regions from T1 to Tx for each QoS and 1 is set in each QoS at the time when the cell is to be read.

For example, when the time T2 is reached a cell is read from the cell buffer QoSN where 1 is set in the timing table. Immediately, the binary information at the time T2 of QoSN is cleared (set to 0), and 1 is set at the time of T2 plus the reading interval. For example, if the reading interval of QoSN is 5, 1 is set at T7.

Likewise at time T3 cell reading is performed from the cell buffer of QoS2, the binary information of time T3 of this QoS2 is cleared (set to 0), and 1 is set at the time of T3 plus the reading interval of QoS2.

This action is repeated at T4, T5, T6 . . . . A description of competition control when 1 is set in a plurality of QoS at the same time will be omitted.

In this way, the conventional scheduling system reads a cell (or cells) from the cell buffer of each ATC/QoS under the control of a timing table prepared on the basis of the desired (designed) time sequence.

However, with the scheduling system shown in Japanese Patent Kokai No. 11-355304, storage regions of (QoS number N)×(time Tx) must be provided in the timing table to follow the desired time sequence. Also, this Tx depends on the cell-reading intervals of the accommodated services, and therefore needs to be the maximum reading interval (lowest rate) among the various cell-reading intervals (or the accommodated services).

As a result, there is a problem that the storage medium needed for the scheduling function must have a large capacity. Consequently, there is a problem that the entire ATM node apparatus which includes the scheduling device is also increased in size.

For example, in the case of ITU-T I. 371, the cell rate (A: units [cells/second]) is given by a floating point representation; accordingly if a minimum settable rate, i.e., 1 [cell/second], should be provided and the physical rate of the communication path is assumed to be 622.08 [Mbit/s], the reading interval becomes about $1.5×10^6$ [cells]. Therefore, even if N is 1, a storage region capacity of 1.5 M bits is necessary.

Consequently, there is a demand for a scheduling device that is capable of greatly reducing the storage region capacity required for the scheduling function.

SUMMARY OF THE INVENTION

According to a first aspect of the present invention, there is provided a scheduling device comprising:

a plurality of queues for storing at least one incoming cell in at least one queue among the plurality of queues, the plurality of queues being allotted a plurality of queue numbers respectively;

a controller for setting a read time for each of the at least one cell stored in the at least one queue, and giving instructions for cell output to each of the at least one queue; and a content addressable memory (CAM) for storing the read time and information indicating presence or absence of each of the at least one cell in the respective queue, addresses being defined in the content addressable memory in connection with the plurality of queue numbers respectively. By providing the content addressable memory and giving cell output instructions to each queue in which the incoming cells are stored, the capacity of the storage region required for scheduling can be very greatly reduced.

According to a second aspect of the present invention, there is provided a scheduling device comprising:

a plurality of queues for storing a plurality of incoming cells respectively, the plurality of queues being allotted a plurality of queues numbers respectively;

a first cell output controller for setting a read time for each of the plurality of cells stored in each of the plurality of queues individually, and giving instructions for cell output to each of the plurality of queues individually;

a content addressable memory for storing the read time of each of the plurality of cells and valid cell information indicating presence or absence of each of the plurality of cells in the respective queue, addresses being defined in the content addressable memory in connection with the plurality of queue numbers respectively;

a read time storage unit for storing a first read time of each of cells that have not been read at a second read time set by the first cell output controller when a particular cell has been read at the second read time upon instructions from the first cell output controller, and for storing read time comparison condition representing presence/absence of other cells that should have been read at the same time as the second read time;

a virtual time selector for utilizing the first read time as a virtual time and the read time comparison condition as virtual time comparison condition if the first read time is stored in the read time storage unit, and for utilizing an actual time counting a cell input/output period as the virtual time if the first read time is not stored in the read time storage unit;

a read period storage unit for storing a read period having a periodic interval predetermined for each queue and a carry value obtained when calculating a next read time for each queue, the next read time for each queue being obtained upon updating the read time for each queue;

a read time controller for reading a first address of a cell outputtable upon supplying the actual time to the content addressable memory to obtain an actual time matching queue number, actual time data matching information and actual time multiple matching queue information on the basis of the first address and the valid cell information at the actual time, and reading a second address of a cell outputtable upon supplying the virtual time to the content addressable memory to obtain a virtual time matching queue number, virtual time data matching information and virtual time multiple matching queue information on the basis of the second address and the valid cell information at the virtual time, thereby updating the second read time and the read time comparison condition stored in the read time storage unit in accordance with the actual time matching queue number, actual time data matching information and actual time multiple matching queue information and the virtual time matching queue number, virtual time data matching information and virtual time multiple matching queue information, or updating the second read time and the read time comparison condition stored in the read time storage unit in accordance with the read period and carry value stored in the read period storage unit;

a content addressable memory controller for updating the read time of a first cell stored in the content addressable memory to the actual time if the queue for the first cell is vacant and available to store an incoming cell and the actual time is greater than the read time of the first cell stored in the content addressable memory, or for updating the read time and valid cell information of the first cell stored in the content addressable memory in accordance with the valid cell information of the first cell at the virtual time and the read period and carry value of the first cell stored in the read period storage unit, after the first cell output controller gives the cell output instructions at the virtual time;

a cell output instruction unit for preparing cell output instructions to be given to a queue if a queue number indicated by an address of a cell outputtable upon supplying the virtual time to the content addressable memory matches a queue number indicated by the address at the virtual time on the basis of the virtual time matching queue number; and a second cell output controller for giving the cell output instructions to the cell in accordance with the cell output instructions prepared by the cell output instruction unit. By providing the content addressable memory and giving cell output instructions to each queue in which the incoming cells are stored, the capacity of the storage region required for scheduling can be very greatly reduced.

According to a third aspect of the present invention, there is provided a cell communication device comprising the scheduling device according to the first or second aspect of the present invention described above. By employing the scheduling device having a storage region of reduced capacity for cell communications, efficient use of network resources is made possible.

BRIEF DESCRIPTION OF THE DRAWINGS

FIG. 9 is a diagram illustrating an example of the scheduling processing performed by the ATM node device shown in FIG. 1;

FIG. 10 is similar to FIG. 9 and illustrates the scheduling processing in a different time period;

FIG. 11 is similar to FIGS. 9 and 10 and illustrates the scheduling processing in a further different time period.

Figures 1, 2:
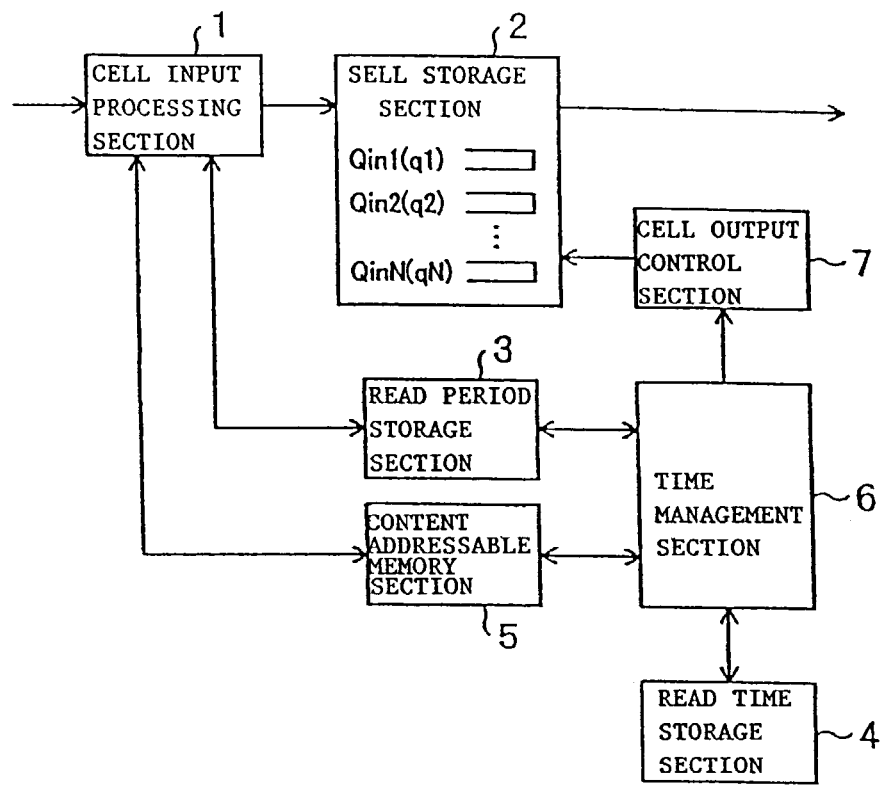
FIG. 1 illustrates the internal layout of an ATM node device according to an embodiment of the present invention.
FIG. 2 illustrates a timetable used for a prior art scheduling process.

DETAILED DESCRIPTION OF THE INVENTION (A) First Embodiment

Hereinbelow, a first embodiment of a scheduling device and cell communication device according to the present invention is described in detail with reference to the drawings.

In this embodiment, a scheduling device of a cell communication device (such as an ATM node device) existing in an ATM communication network is equipped with a content addressable memory and has a scheduling function that instructs cell output (transmission) on each of queues in which received ATM cells are stored.

First of all, a general description of a content addressable memory device included in the scheduling device of the cell communication device (for example an ATM node device) according to this embodiment will be given and characteristic features of this embodiment will be described.

(A-1-1) Content Addressable Memory Device

Typically, an ATM node device includes a semiconductor storage device. An ordinary semiconductor storage device is capable of writing (write processing) data present on a data bus into a storage region having an address indicated (specified) on (by) an address bus and reading (read processing) the data from a storage region having an address indicated by the address bus to the data bus.

In contrast, a content addressable memory device can perform not only the data writing processing and data reading processing in the same way as the ordinary semiconductor storage device, but also a content addressable memory comparison processing in which data present on the data bus is compared with data in storage regions and an address (matching address) of the storage region in which matching data is stored is output to the address bus.

During the content addressable memory comparison processing, the content addressable memory device also outputs a signal (match flag) to indicate matching, if data is present in the storage region that matches the data carried by (present on) the data bus.

If a plurality of data stored in a plurality of storage regions match the data carried by the data bus, the content addressable memory device outputs a signal indicating multiple matches (multiple match flag). An address of a storage region to be output to the address bus among a plurality of matching addresses depends on the construction of the content addressable memory device. For example the matching address having the smallest value may be output.

In a conventional semiconductor storage device, time is allocated to the address and binary information representing the fact of reading is allocated to the data. In the content addressable memory device of this embodiment, on the other hand, a queue number is allocated to the address and the read time is allocated to the data storage region. It is possible to implement a scheduling function by reading cells from the queue corresponding to a matching address (queue number) that is output upon performing the content addressable memory comparison processing with the data storage regions of the content addressable memory device at the current time.

The storage region capacity that is needed for the content addressable memory device is (number of queues N)×(log2 (maximum reading interval)), so a considerable reduction in storage capacity can be achieved.

A scheduling device and ATM node device (cell communication device) according to the first embodiment including such content addressable memory device is described below in detail with reference to the drawings.

(A-1-2) Construction of the ATM Node Device

FIG. 1 illustrates the internal layout of an ATM node device according to this embodiment.

As shown in FIG. 1, the ATM node device includes a cell input processing section 1, cell storage section 2, read period storage section 3, read time storage section 4, content addressable memory section 5, time management section 6, and cell output control section 7.

Using the header information of an incoming cell (for example the VPI (virtual path identifier) or VCI (virtual channel identifier)), the cell input processing section 1 ascertains in which queue, among a plurality of queues in the cell storage section 2, the incoming cell should be stored (i.e. the queue number (Qin) is determined), and supplies a command to the cell storage section 2 to cause the cell storage section 2 to store the incoming cell in the queue having the determined queue number (Qin). Also, the cell input processing section 1 reads from the content addressable memory section 5 the data stored in a region having an address that matches the queue number. After performing suitable processing to the data, the cell input processing section 1 writes the data again in the content addressable memory section 5.

The cell storage section 2 stores a cell that is introduced from the cell input processing section 1 in the corresponding queue and outputs a cell from a queue in accordance with a queue designation signal from the cell output control section 7. The cell storage section 2 is constituted by a cell buffer memory of the first-in first-out type. A plurality of cell buffer memories are provided individually for a plurality of ATC/QoS or connections.

The read period storage section 3 stores the read period of each queue in the cell storage section 2 and the carry value of the read period. Normally, in the scheduling function, processing is performed taking the single cell time (period) as the unit, so the interval with which cells are read is an integer (integral multiple of the single cell time). Since the read period is a real number, the carry value is the decimal portion of the difference between the read period and the interval with which the cells are actually read. The read period storage section 3 performs reading of the read period stored in the read period storage section 3 and/or writing (updating)/reading of the carry value stored in the read period storage section 3, under the control of the cell input processing section 1 and the time management section 6.

The read time storage section 4 is constituted by a buffer memory of the first-in first-out type and stores the read time of each queue in the cell storage section 2. Writing/reading of the read time into/from the read time storage section 4 is performed under the control of the time management section 6.

The content addressable memory section 5 is the content addressable memory device described above, and stores the read time and validity flag for each queue. The validity flag is a flag indicating whether a valid cell is present or not and is constituted by binary information. The binary information "1" indicates the presence of the cell(s) in the queue concerned, and "0" indicates the absence of the cell in the queue concerned. In the content addressable memory section 5, the read time and validity flag of "Qin1" are stored at address 1, the read time and validity flag of "Qin2" are stored at address 2, the read time and validity flag of "QinN" are stored at address N. That is, a read time and validity flag are allocated to each queue. Reading/writing processing and content addressable memory comparison processing of the content addressable memory section 5 are executed under the control of the cell input processing section 1 and the time management section 6.

The time management section 6 has a function of performing overall management of scheduling for incoming cells. Specifically, the time management section 6 performs overall management of virtual time processing, content addressable memory comparison processing, read time processing, cell output processing and actual time processing. A description of these processes will be given later.

The cell output control section 7 reads and outputs a cell from a queue designated by the time management section 6. A plurality of queues are formed in the cell storage section 2.

(A-2) Operation of the ATM Node Device

The scheduling operation of the ATM node device of the first embodiment is described below.

First, a description will be given below of the overall operation and the various processes performed by the scheduling device of this embodiment.

(A-2-1) Overall Operation of the Scheduling Device

Figure 3:
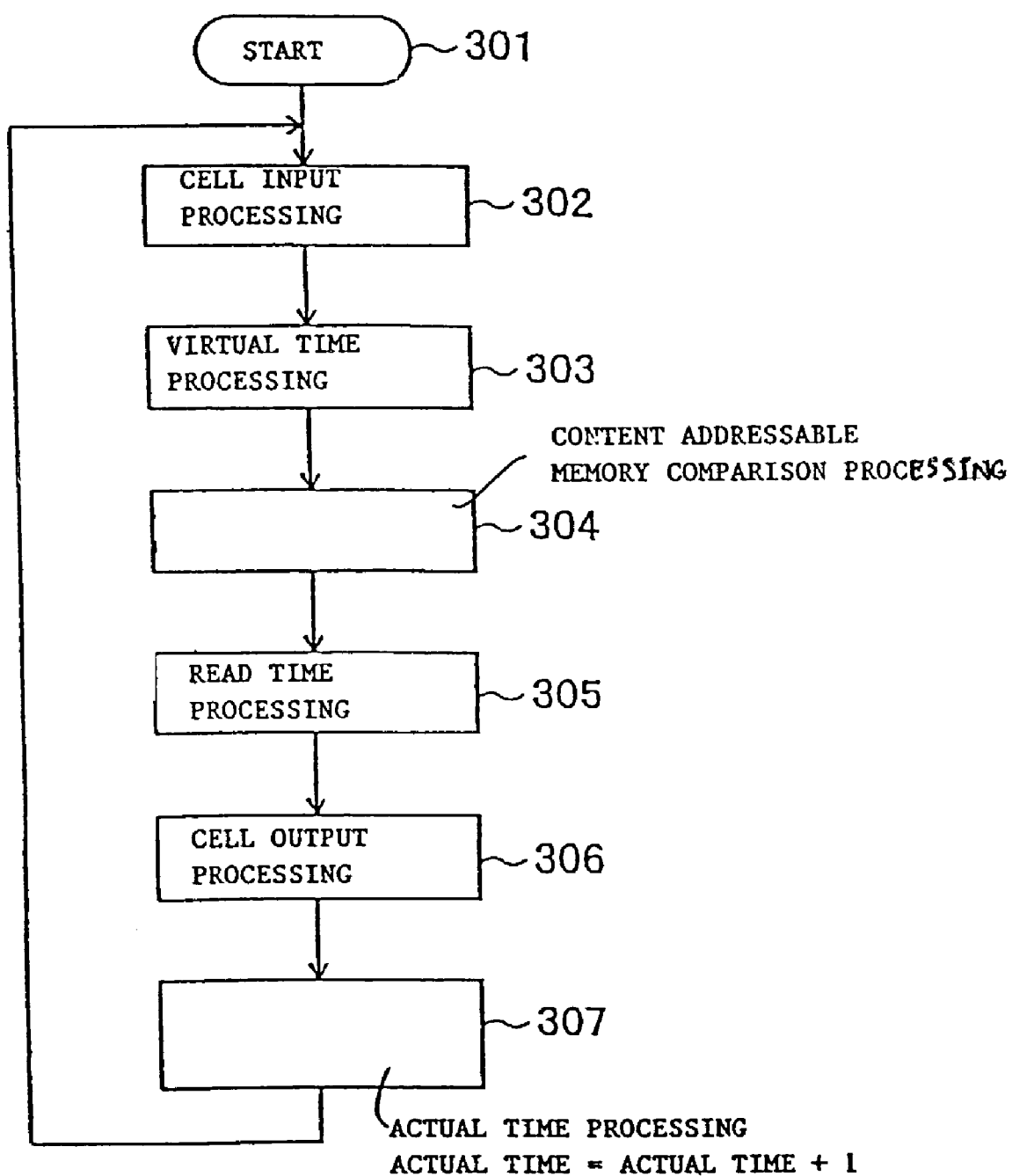
FIG. 3 illustrates a flowchart of an overall scheduling process performed by the ATM node device shown in FIG. 1.

FIG. 3 is a flowchart illustrating the flow of the overall processing of the scheduling operation of this embodiment. Details of the processes shown in FIG. 3 are indicated in the flowcharts of FIG. 4 to FIG. 8.

As shown in FIG. 3, when a cell arrives at the scheduling device of this embodiment, cell input processing is performed by the cell input processing section 1, the content addressable memory section 5 and the time management section 6. As a result, the incoming cell is stored in the corresponding queue of the cell storage section 2 (cell input processing) (step 302).

The virtual time is determined from the actual time used to calculate (count) the cell input/output period and the read time stored in the read time section 4 (virtual time processing) (step 303). The actual time and virtual time are supplied to the content addressable memory section 5 and the addresses at these times are read and compared with each other (content addressable memory comparison processing) (step 304).

Based on the result of the content addressable memory comparison, the read time stored in the read time storage section 4 is updated (read time processing) (step 305).

Also, based on the result of the content addressable memory comparison, a cell is output from the queue having the determined queue number and the read time stored in the content addressable memory section 5 is updated (cell output processing) (step 306).

The count of the actual time increments by "1" after step 306 (actual time processing) (step 307). The program then returns to step 302 and the scheduling processing is repeated.

Each of steps 302 to 307 of the scheduling processing is described below in detail.

(A-2-2) Cell Input Processing (Step 302)

Figure 4:
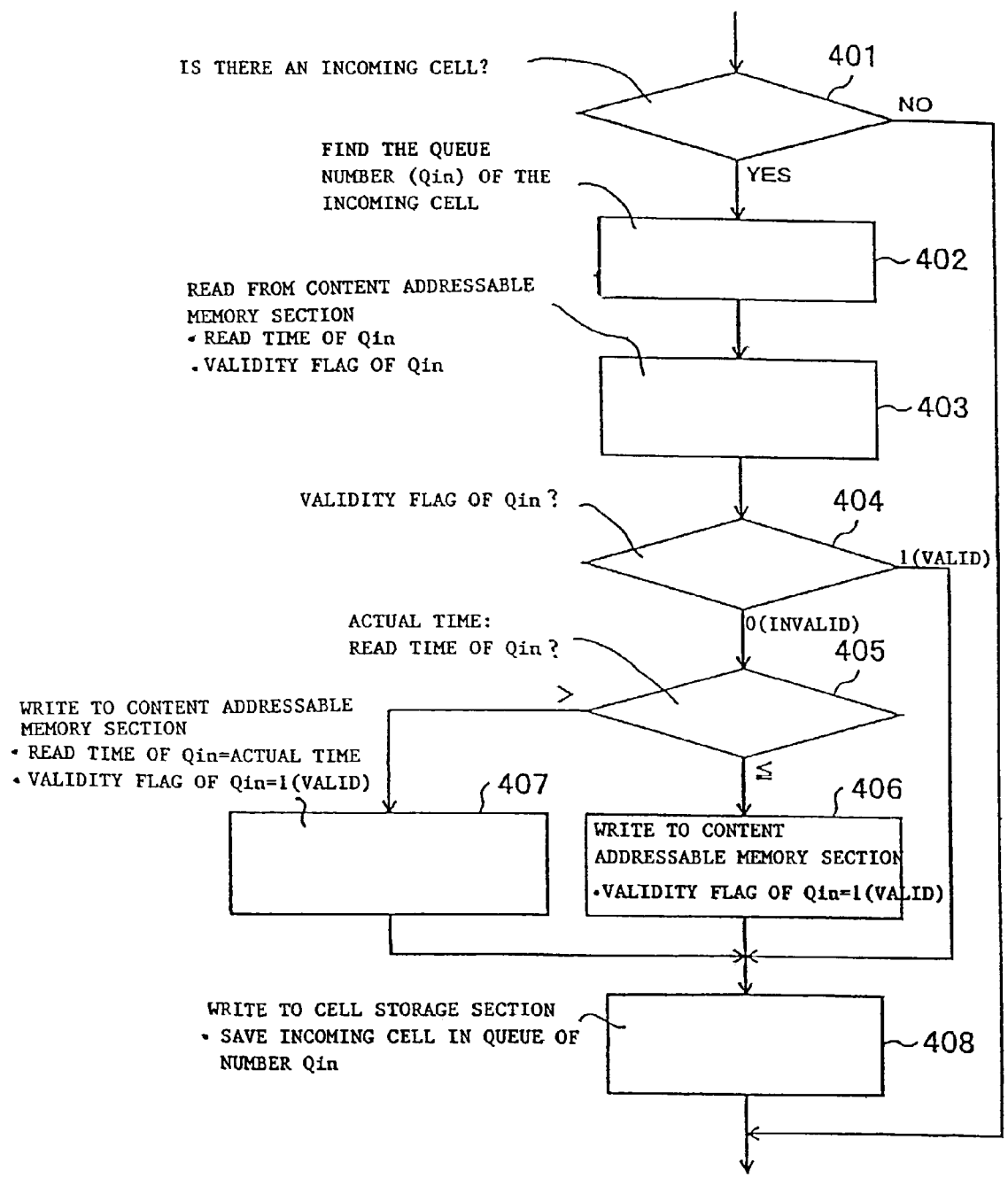
FIG. 4 illustrates a detailed flowchart of cell input processing included in the flowchart of FIG. 3.

FIG. 4 shows a flowchart of the cell input processing.

The cell input processing is processing whereby an incoming cell is stored in the corresponding queue of the cell storage section 2, performed chiefly by the cell input processing section 1, the time management section 6 and the content addressable memory section 5.

When a cell arrives at the cell input processing section 1 of the scheduling device according to this embodiment (step 401) the queue number is ascertained from the header information (for example VPI and VCI) of this incoming cell (step 402).

Using the queue number that has thus been ascertained, the read time of the queue having the queue number and the validity flag indicating the presence/absence of the stored cell in the queue indicated by this queue number are read from the content addressable memory section 5 (step 403).

If the validity flag is "1", the incoming cell is saved into the queue indicated by this queue number (step 404 to step 408).

If the validity flag is "0", a magnitude comparison is made (step 405) of the read time of this queue number and the actual time (step 405). If the actual time is greater than the read time of this queue number, the read time of this queue number is updated to the actual time and the validity flag is rewritten to "1" (step 407). On the other hand, if the actual time is no more than the read time of the queue number, the validity flag is rewritten to "1" (step 406).

In this way, the incoming cell is saved in an appropriate or corresponding queue of the cell storage section 2 after rewriting the read time and validity flag of the content addressable memory section 5 (step 408).

(A-2-3) Virtual Time Processing (Step 303)

Figure 5:
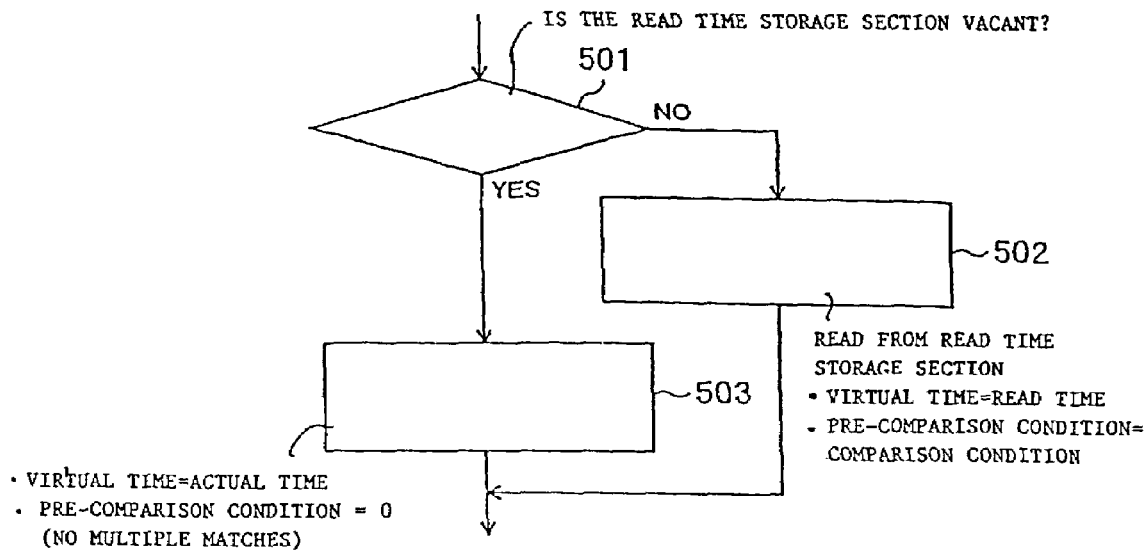
FIG. 5 illustrates a detailed flowchart of virtual time processing included in the flowchart of FIG. 3.

FIG. 5 shows a flowchart of the virtual time processing.

The virtual time processing is processing whereby the virtual time is set to be equal to either the actual time or the read time stored in the read time storage section 4 in accordance with the storage condition of the read time storage section 4 (in accordance with what is stored in the storage section 4).

If the read time is stored in the read time storage section 4 (No at step 501), the virtual time is set to be equal to the read time of the read time storage section 4, and the pre-comparison condition is set to be equal to the comparison condition of the read time storage section 4 (step 502).

If the read time is not stored in the read time storage section 4 (Yes at step 501), the virtual time is set to be equal to the actual time, and the precomparison condition is set to be equal to "0" (step 503).

(A-2-4) Content Addressable Memory Comparison Processing (Step 304)

Figure 6:
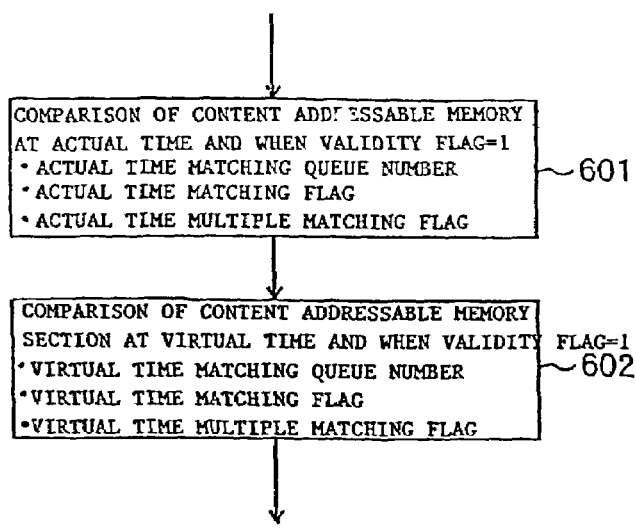
FIG. 6 illustrates a detailed flowchart of content addressable memory comparison processing included in the flowchart of FIG. 3.

FIG. 6 shows a flowchart of the content addressable memory comparison processing.

The content addressable memory comparison processing is processing in which the validity flag is assumed to be "1", the read time is assumed to be the actual time, and comparison processing thereof with the content addressable memory section 5 is performed. Further, the content addressable memory comparison processing makes another comparison with the content addressable memory section 5 on the assumption that the validity flag is "1" and the read time is the virtual time.

When cells are present in the queues, a plurality of read time stored in the content addressable memory section 5 is compared with the actual time. The address of the storage section 5 at which the matching read time is stored is taken as the actual time matching queue number and the actual time match flag is set to "1". If there are multiple matches, the actual time multiple match flag is set to "1" (step 601).

Subsequent to step 601, a plurality of read time stored in the content addressable memory section 5 is compared with the virtual time. The address at which the matching read time is stored is taken as the virtual time matching queue number and the virtual time match flag is set to "1". If there are multiple matches, the virtual time multiple match flag is set to "1" (step 602).

As understood from the above, the content addressable memory comparison processing includes comparison processing even in the case of multiple matches at the actual time and the virtual time respectively.

(A-2-5) Read Time Processing (Step 305)

Figure 7:
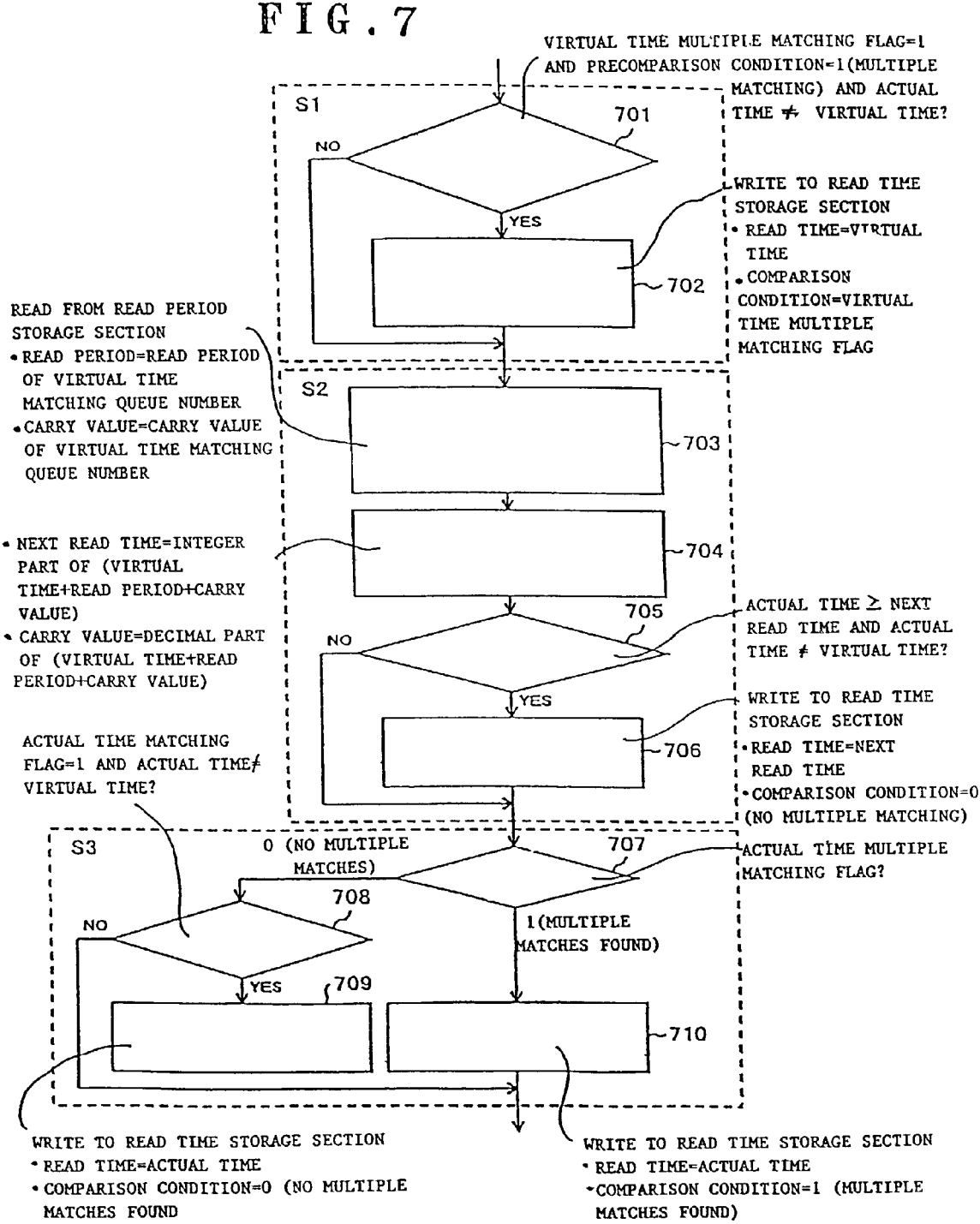
FIG. 7 illustrates a detailed flowchart of read time processing included in the flowchart of FIG. 3.
Figure 8:
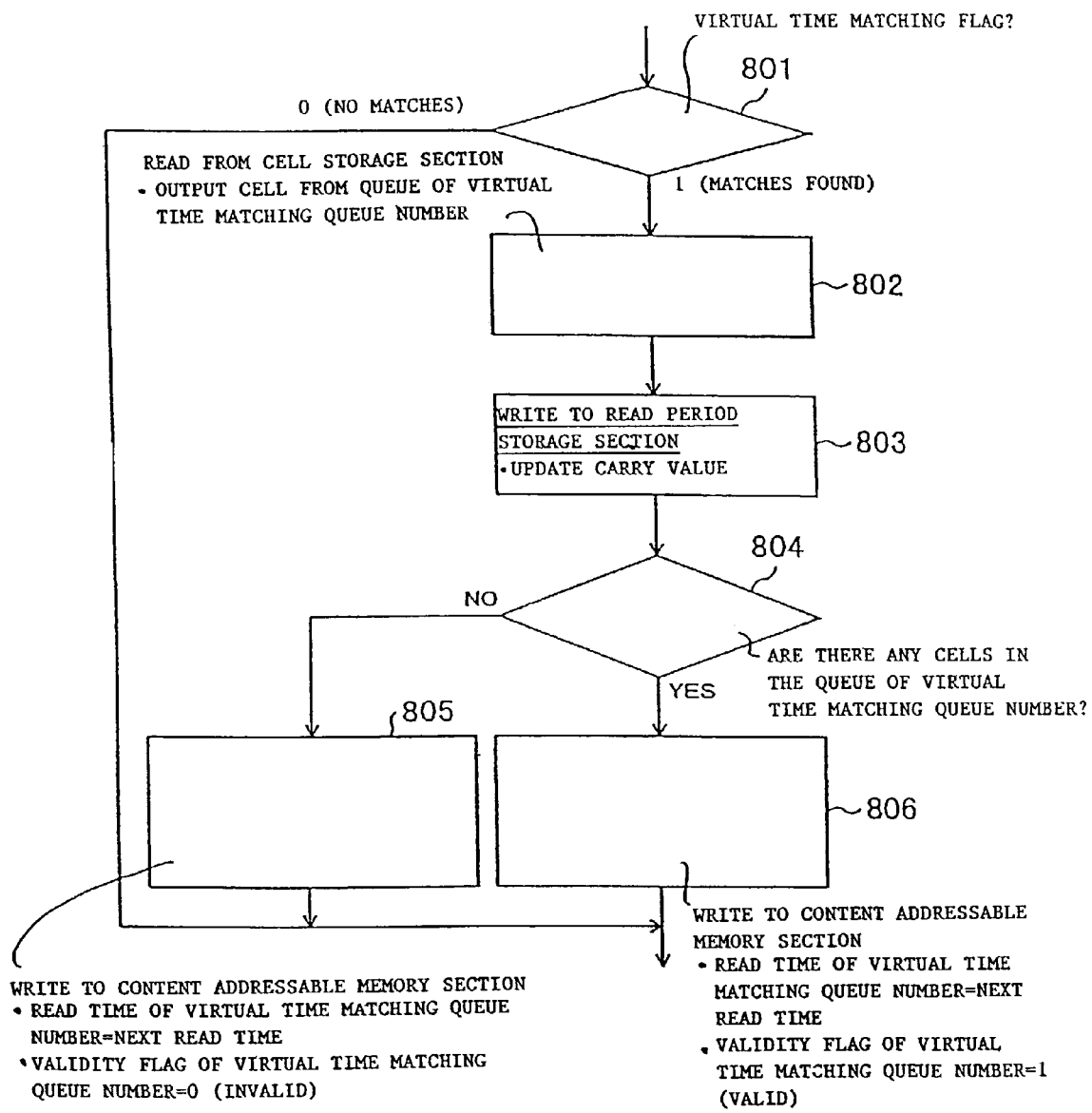
FIG. 8 illustrates a detailed flowchart of cell output processing included in the flowchart of FIG. 3.

FIG. 7 shows a flowchart of the read time processing.

The read time processing is processing to set (determine) the read time that is stored in the read time storage section 4 (i.e. the reading time at which the next queue number is read) and includes steps S1, S2 and S3.

S1 is setting processing of the read time when there are multiple matches in the content addressable memory section 5 at the virtual time.

If, by the content addressable memory comparison processing, it is found that there are multiple matches at the virtual time, multiple matches also exist at the pre-comparison condition, and the actual time is different from the virtual time, then the read time of the read time storage section 4 is updated by the virtual time and the comparison condition is updated by the virtual time multiple match flag (step 702).

S2 is processing to set the next read time for the queue that has been read once.

In accordance with the read period and carry value of the queue that is stored in the read period storage section 3 (step 703), the next read time is determined from the integer part of the sum of the virtual time, read period and carry value (step 704). Also, the carry value is determined from the decimal part of the sum of the virtual time, read period and carry value (step 704).

If, by comparing the magnitudes of the actual time and the next read time, it is found that the actual time is greater than or equal to the next read time and the actual time is different from the virtual time (step 705, Yes), this next read time updates (replaces) the read time of the read time storage section 4 and the comparison condition is made "0" (step 706).

S3 is processing to set the read time when there are multiple matches in the content addressable memory section 5 at the actual time.

If, by the content addressable memory comparison storage processing, it is found that there are multiple matches at the actual time (step 707), the read time of the read time storage section 4 is updated to the actual time and the comparison condition is updated to "multiple matches present" (step 710).

If, by the content addressable memory comparison storage processing, it is found that there are no multiple matches at the actual time (step 707), but there is a single match at the actual time, and the actual time is different from the virtual time (step 708, Yes), then the read time of the read time storage section 4 is updated to the actual time and the comparison condition is updated to "0" (step 709).

(A-2-6) Cell Output Processing (Step 306)

The cell output processing is processing whereby, if the virtual time match flag is "1", a cell is output from the queue of this queue number, and the read time and validity flag of this queue number in the content addressable memory section 5 are updated. Actual cell output is performed by the cell output control section 7.

If, as a result of the content addressable memory comparison processing, it is found that the virtual match flag is "1" (step 801), a cell is output from the queue having this queue number (step 802).

The carry value determined in S2 of the read time processing is written into the carry value in the read period storage section 3 for updating of the carry value (step 803).

After this, the read time of this queue number of the content addressable memory section is rewritten by the next read time (step 806 and step 805). If a cell is present in the queue which has matching at the virtual time (step 804, Yes), the validity flag of this queue number of the content addressable memory section is rewritten to "1" (step 806). If no cell is present in the queue (step 804, No), the validity flag of this queue number of the content addressable memory section is rewritten to "0" (step 805).

Concrete scheduling operation of the scheduling device will now be described.

(A-2-7) Example of Operation of Scheduling Device

FIGS. 9 to 11 are diagrams illustrating relationship between an incoming cell sequence and memory contents of the scheduling device that change with the time.

The operating conditions of the scheduling device, which are common to FIG. 9 to FIG. 11, are first described. The number N of the queues in the cell storage section 2 is five, the read period of "Qin1"=2.2 [cell period], the read period of "Qin2"=6.2 [cell period], the read period of "Qin3"=7.4 [cell period], the read period of "Qin4"=8.6 [cell period] and the read period of "Qin5"=9.8 [cell period]. q1, q2, . . . , q5 are incoming cells or output cells; these cells are cells that are to be stored in the queues q1, q2, . . . , q5 of the cell storage section 2 respectively.

In the initial condition of the read period storage section 3, the queues have the above-mentioned predetermined read periods and the same carry value "0.0". In the initial condition of the content addressable memory section 5, "0" is set to all the validity flags. The "actual time" is the time obtained by counting up at intervals of one cell period.

The scheduling operation of this embodiment is described below sequentially at intervals of one cell period, with reference to FIGS. 9 to 11 and FIGS. 4 to 8.

In FIG. 9, no cells arrive at the actual time=0 and 1, so no alteration is generated in the respective storage sections.

At the actual time=2, an incoming cell q5 arrives at the cell input processing section 1 (step 401) and it is ascertained that the Qin (queue number) where the incoming cell q5 is to be saved is "5" (step 402). Read time "0" and validity flag "0" of "Qin5" are read from the content addressable memory section 5 (step 403). In accordance with this validity flag and read time (step 404 and step 405), the read time of "Qin5" in the content addressable memory section 5 is updated to the actual time "2" and the validity flag is updated to "1" (step 407). The incoming cell q5 is then stored in the storage region (or queue) Qin5 of the cell storage section 2 (step 408).

Since no read time is stored or set in the read time storage section 4, the actual time "2" is set as the virtual time and "0 (no multiple matches)" is set as the pre-comparison condition (steps 501 to 503).

The content addressable memory comparison processing is performed with the actual time and the virtual time respectively. The actual time match queue number of the incoming cell q5 at the actual time "2" is "5". At the actual time "2", the actual time "2" coincides with the read time "2" stored in the content addressable memory section 5. Thus, the actual time match flag is "1". A plurality of data is not read so that the actual time multiple matches flag is "0" (step 601). At the virtual time "2", the same thing can be said. The virtual time match queue number is "5", the virtual time match flag is "1" and the virtual time multiple matches flag is "0" (step 602).

After the content addressable memory comparison processing, the virtual time multiple matches flag is "0" and the actual time is equal to the virtual time (step 701). Therefore, the next read time and carry value are determined in accordance with the read period of "Qin5" that is stored in the read period storage section 3 (step 704).

That is, the read period "9.8" of "Qin5" and the carry value "0.0" are read from the read period storage section 3 and the next read time is set to be the integer part of (virtual time+read period+carry value). Also the carry value is set to be the decimal part of (virtual time+read period+carry value). Consequently, the next read time in this case is set to "11" (=integer part of (2+9.8+0.0) and the carry value is set to "0.8" (=the decimal part of (2+9.8+0.0)).

Also, since the actual time multiple matches flag is "0", the actual time match flag is "1" and the actual time is equal to the virtual time, the read time is not written into the read time storage section 4 (steps 707 to 709).

Next, since the virtual time match flag is "1" (step 801), the cell q5 is output from the queue "Qin5" in the cell storage section 2 (step 802).

After the cell is output from the queue, the carry value is updated by writing the carry value "0.8", that has been newly set as described above, to the read period storage section 3 (step 803). Since there are no cells in the queue having the virtual time match queue number (step 804), the read time is updated by writing the next read time "11" into the content addressable memory section 5, and the validity flag of the virtual time match queue number is updated to "0" (step 805).

When incoming cells q4, q3 and q2 arrive at the actual times 3, 4 and 5 respectively, the same processing as the processing for the actual 2 is performed in regard to respective queues of the incoming cells.

At the actual time=6, the incoming cell q2 arrives at the cell input processing section 1 (step 401). It is then ascertained that Qin="2" (step 402). The read time "11" of "Qin2" and the validity flag "0" are read from the content addressable memory section 5 (step 403). Since the validity flag is "0" (step 404), the magnitude of the actual time "6" is compared with the magnitude of the read time "11" of "Qin2" (step 405) in the content addressable memory section 5. The read time "11" of "Qin2" is larger so that the read time of "Qin2" is not written into the content addressable memory section 5, and only the validity flag "0" is updated to "1" (step 406). Subsequently, the incoming cell q2 is stored in the Qin of the cell storage section 2 (step 408).

It should be noted that this differs from what happens in the case of the actual times 0 to 5 in that the read time of the content addressable memory section 5 is not updated, since the read time of the content addressable memory section 5 is larger than the actual time.

Since no read time is stored in the read time storage section 4, the virtual time is set to be the actual time "6" and the pre-comparison condition is set to be "0" (steps 501 and 503). The actual time match flag and actual time multiple matches flag are "0" respectively for the actual time 6 (step 601), and the virtual time match flag and virtual time multiple matches flag are also "0" respectively for the virtual time "6" (step 602).

Consequently, the read time processing of steps 701 to 710 is not performed and the read time is not written to the read time storage section 4.

Also, since the actual time match flag and the virtual time match flag are both "0", cells are not output from the cell storage section 2 but stay stored in the cell storage section 2 (steps 801 to 806).

When the incoming cells q3, q4 and q5 arrive at the actual times 7, 8 and 9 respectively, the same processing as in the case of the actual time=6 is performed in regard to the respective queues of the incoming cells.

When the incoming cell q2 arrives at the cell input processing section 1 at the actual time=10 (step 401), it is ascertained that Qin is "2" (step 402). The read time "11" and validity flag "1" of "Qin2" are read from the content addressable memory section 5 (step 403). Since the validity flag of "Qin2" of the content addressable memory section 5 indicates "1", the cell is stored in the storage region q2 of the cell storage section 2 (step 408).

This therefore differs from what happens at the actual times 0 to 9 in that, when the validity flag of "Qin2" of the content addressable memory section 5 is "1", the incoming cell is stored in the corresponding queue without the read time of the queue number of the content addressable memory section 5 being updated at this stage.

At the actual time "10", no read time is stored in the read time storage section 4, so the virtual time is set to be the actual time "10" and the pre-comparison condition is set to be "0" (steps 501 to 503).

In the content addressable memory comparison processing, the actual time match flag, virtual time match flag, actual time multiple match flag and virtual time multiple match flag are respectively "0" at the actual time and the virtual time respectively, just as in the case of the actual times 6 to 9. Therefore, no cell is output from the cell storage section 2. Accordingly, a description of the subsequent processing for the actual time "10" will be omitted.

An incoming cell q3 arrives at the cell input processing section 1 at the actual time=11. Since the validity flag of "Qin3" of the content addressable memory section 5 is "1", the cell is stored in the storage region q3 of the cell storage section 2 (steps 401 to 408).

Since the read time is not set or stored in the read time storage section 4 (step 501), the virtual time is set to be the actual time "11" and the pre-comparison condition is set to be "0" (step 503).

At the actual time "11", the actual time match queue number is "2", the actual time match flag is "1", the actual time multiple match flag is "1", the virtual time match queue number is "2", the virtual time match flag is "1" and the virtual time multiple match flag is "1" (steps 601 and 602).

In this embodiment, the cell output instructions are made for a plurality of cells at the same time such that the cells are (successively) output from the one having the smallest queue number. Since the queue number "2" is the smallest among the queue numbers of the incoming cells arriving at the actual times 6 to 9 and 11, the actual time match queue number "2" is selected. It should be noted however that the present invention is not limited in this regard. For example, the cell output instructions may be made on the basis of the read period (e.g., the cells are output from the one having the shortest read period).

Since the actual time is equal to the virtual time (step 701), the next read time "11" is determined on the basis of the read period of the read period storage section 3 (steps 703 and 704). The magnitude of the actual time is then compared with the magnitude of the next read time (step 705). Since the actual time multiple match flag is "1", the actual time "11" is set into the read time of the read time storage section 4 and "1" is set into the comparison condition (step 710).

In this way, the cell q2 is output from the queue "Qin2" of the cell storage section 2 (step 802).

After the cell is output, the carry value in the read period storage section 3 and the read time of the virtual time match queue number in the content addressable memory section 5 are updated (steps 803 to 806).

An incoming cell q1 arrives at the cell input processing section 1 at the actual time 12. The read time of the queue "Qin1" of the content addressable memory section 5 is "0" and the validity flag is "0", so the read period is updated to be the actual time "12" and the validity flag is updated to be "1" (step 407). The incoming cell q1 is then stored in the queue Qin1 of the cell storage section 2 (step 408).

Since the read time "11" is stored in the read time storage section 4, the read time "11" is set into the virtual time and "1" is set into the comparison condition (steps 501 and 502).

At the actual time "12", since the read time in the content addressable memory section 5 is the same as the read time of the cell q1 which arrived previously, the actual time match queue number is set to be "1", the actual time match flag is set to be "1", and the actual time multiple match flag is set to be "0" (step 601). For the virtual time "11", the virtual time match queue number is "3", the virtual time match flag is "1" and the virtual time multiple match flag is "1" (step 602).

At this point, the virtual time multiple match flag is "1", the pre-comparison condition is "1" and the actual time differs from the virtual time, so that the virtual time "11" is set into the read time of the read time storage section 4 and the virtual time multiple match flag "1" is set into the comparison condition (step 702).

The next read time is acquired in accordance with the read period of the read period storage section 3 (steps 703 to 704). The magnitudes of the actual time "12" and the next read time are compared with each other (step 705). The actual time multiple match flag is "0", so the actual time "12" is set into the read time of the read time storage section 4 and the virtual time multiple match flag "0" is set into the comparison condition (step 709).

The cell q3 stored in the storage region "Qin3" of the cell storage section 2 is output (step 801). The carry value for Qin3 in the read time period storage section 3 is updated to "0.8" and the read time for Qin3 in the content addressable memory section 5 is updated to "18" (steps 803 to 806).

At the actual time "13", an incoming cell q1 arrives at the cell input processing section 1 and the cell is stored in the storage region Qin1 of the cell storage section 2 (steps 401 to 408).

The read time "11" of the read time storage section 4 is set into the virtual time, and "1" is set into the pre-comparison condition (steps 501 and 502).

The actual time match flag at the actual time "13" becomes "0" (step 601), the virtual time match queue number at the virtual time "11" becomes "4", the virtual time match flag becomes "1" and the virtual time multiple match flag becomes "1" (step 602).

The reason why the virtual time matching queue number "4" is selected here at the virtual time "11" is that the read time storage section 3 is a buffer memory of the first-in first-out type.

Since the virtual time multiple match flag is "1", the pre-comparison condition is "1", and the real time is not equal to the virtual time (step 601), the virtual time "11" is set into the read time and the virtual time multiple match flag "1" is set into the comparison condition (steps 702).

The cell q4 is output from the storage region Qin4 of the cell storage section 2, the read time of the queue q4 is updated to "20" and the validity flag is updated to "0" in the content addressable memory section 5 (step 805). Also, the carry value of q4 in the read time period storage section 3 is updated to "0.2" (step 803).

The similar operation as in the case of the actual time=13 is performed in respect of the actual time 14 to 21.

At the actual time=22 there are no incoming cells to the cell input processing section 1, so setting of the virtual time is performed without carrying out the cell input processing (i.e., the control program jumps from step 401 to step 501).

Since the read time is stored in the read time storage section 4, the read time "20" is set into the virtual time and the comparison condition "1" is set into the pre-comparison condition (steps 501 and 502).

The actual time matching flag then becomes "0" (step 601). The virtual time matching queue number becomes "4", the virtual time matching flag becomes "1" and the virtual time multiple matching flag becomes "0" (step 602).

Next, the cell q4 is output from the cell storage section 2 (step 802). The read time of Qin4 is updated to "28" and the validity flag is updated to "0" in the content addressable memory section 5 (step 805). Also, the carry value of Qin4 in the read time period storage section 3 is updated to "0.8" (step 803).

The similar operation as in the case of the actual time 22 is also performed in regard to the actual time 23 to 25.

At the actual time 26, since there are no input cells, the virtual time processing is performed without performing the cell input processing.

In the read time storage section 3, the read time "25" is set into the virtual time and the comparison condition "0" is set into the pre-comparison condition (steps 501 and 502). The actual time matching flag becomes "0" (step 601), the virtual time matching queue number becomes "1", the virtual time matching flag becomes "1" and the virtual time multiple matching flag becomes "0" (step 602).

Then, the cell q1 is output from the cell storage section 2 (step 802). The read time of Qin1 is updated to "27" and the validity flag is updated to "0" in the content addressable memory section 5 (step 805). The carry value of Qin1 in the read time period storage section 3 is updated to "0.4" (step 803).

Figure 12:
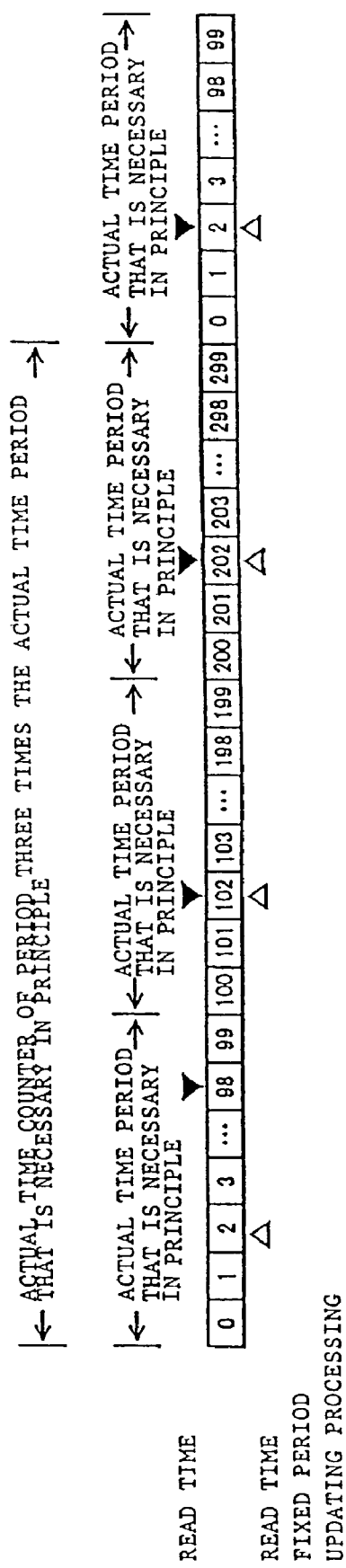
FIG. 12 is a diagram illustrating an example of read time periodic updating processing according to the present invention.

As shown in FIG. 12, when the scheduling device according to this embodiment is actually implemented, there are limitations on the counter that counts the actual time. Consequently the actual time is utilized in cyclic fashion. This would cause an error or defect in the time comparison processing when the actual time is returning from the maximum value to 0. It should be assumed here that the counter that counts the actual time is a 0 to 99 counter. In step 705, a magnitude comparison of the actual time and the next read time is made. It should also be assumed that the next read time is "98" and the actual time is "2", which is in fact later than the next read time. The actual time must be greater than the next read time, but the actual time is shown or indicated as "2". Accordingly, an incorrect comparison result would come out if the numerical values "2" and "98" were simply compared with each other.

This problem can be avoided by modifying the period of the counter for the actual time as shown in FIG. 10.

A counter for the actual time depicted in FIG. 12 has a period three times the period that would in principle be necessary. Read time periodic update processing is performed with this counter. Specifically, the read time is updated to be the actual time when it is found that the actual time exceeds the read time, by comparing the actual time with the read time periodically (e.g., once in each period (0 to 99)) for each queue.

As shown in FIG. 12, if the period necessary in principle is "100", the actual time counter has a period of "300" (three times the period "100"), and the read time periodic updating processing is performed once in each period (i.e., at times "2", "102" and "202" as indicated by the unshaded triangles).

At the time "2" of the counter, the read time "98" is not exceeded by the actual time "2", so updating of the read time is not performed. At the time "102" of the counter, the read time "98" is exceeded by the actual time "102" so that the read time "98" is updated to "102". Likewise, at the time "202" of the counter, the read time is updated to be "202". The shaded triangles (inverted) in FIG. 12 indicate the updated read time respectively.

At the next time "2" of the counter, it is considered that the value in the next "0 to 99" period is larger than that in the period "200 to 299". Thus, the read time is updated to "2". The proper scheduling function of the scheduling device according to this embodiment is therefore ensured.

(A-3) Benefit(s) of the First Embodiment

As described above, the scheduling device according to the first embodiment includes the content addressable memory section, the queue numbers are allocated to the content addressable memory section's addresses at which the incoming cells are stored such that the queue numbers represents the locations of the stored cells, and the respective read time is allocated to the data storage regions. Therefore, the comparison processing with the data storage region(s) of the content addressable memory section can be performed at the current time, and cell reading can be performed from the queue having the matching address. This operation permits the (total) capacity of the storage region(s) that is required to be reduced.

For example, the (total) storage capacity needed for the conventional scheduling processing=(queue number N)× (log2 (maximum reading interval)). If the physical speed of the communication path is 622.08 [Mbit/s], a very large capacity is needed; even if the number of the queues N is 1 (minimum number), the storage capacity needed is 1.4 Mbits.

However, in the case of the scheduling processing according to the present embodiment, even if N is increased to 1,000, the required storage capacity is 22 kbits; (1000)× (log2 $(1.5 \times 10^6)$+1)=22 kbits.

Although the scheduling device according to this embodiment requires a separate read time storage section dedicated to the scheduling function, the storage capacity of the read time storage section is small. For example, even if N is 1,000, the storage capacity need only be 22 kbits (1000× (log2 $(1.5 \times 10^6)$+1)=22 kbits) at the most. Thus, the total capacity required is approximately 44 kbits, and considerable saving in storage capacity compared with previously can be achieved.

(B) Other Embodiments

With the first embodiment described above, an ATM node device incorporated in an ATM network is described as a cell communication device. However, the scheduling device according to the present invention can also be applied to packets having transmission information, and so it can also be applied not just to ATM node devices but also to fixed length packet communication devices used to provide fixed length packet communication.

In the read time processing operation of the scheduling processing described with reference to the first embodiment, processing is performed in the order: S1, S2, S3 (FIG. 4); however, the sequence of this read time processing operation is not restricted to this. That is, for example processing to set the next read time in respect of a queue from which the cell is read (S2) could be carried out after the read time processing (S3). Specifically, the processing could be performed in the order: S1, S3, S2.

Figure 13:
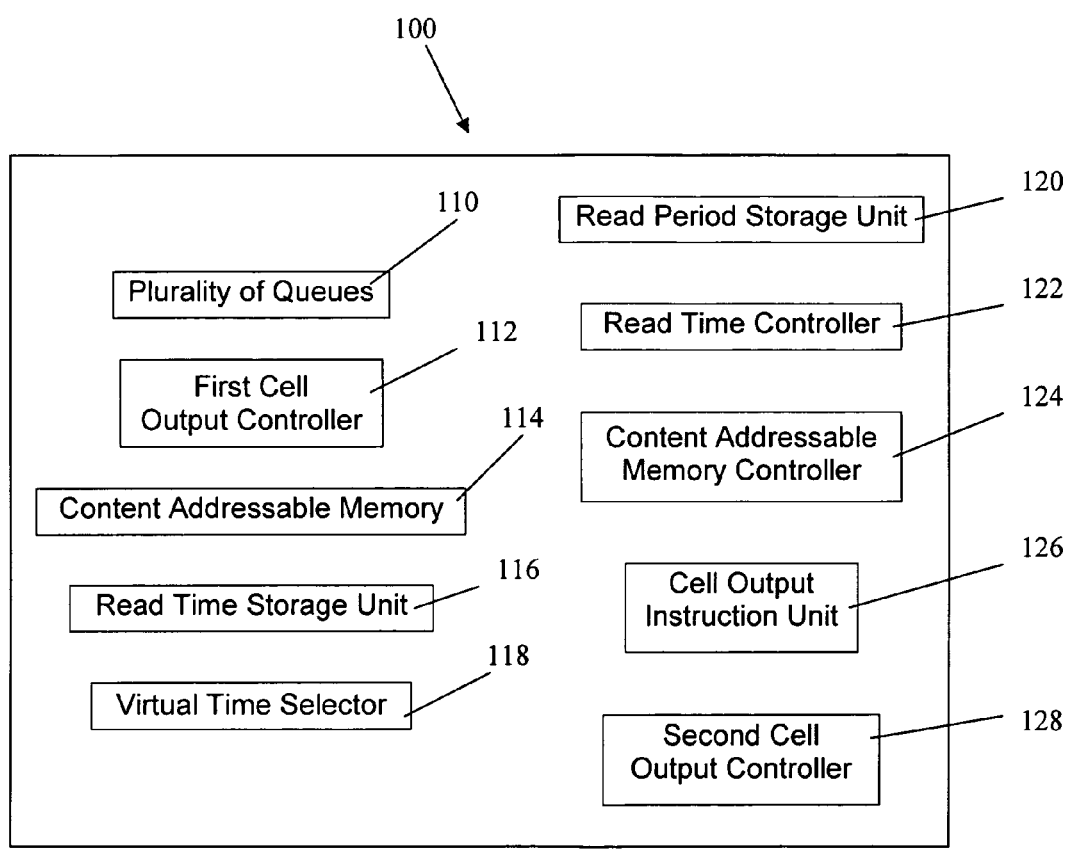
FIG. 13 is a block diagram of a scheduling device or a cell communication apparatus according to the present invention.

FIG. 13 shows an exemplary block diagram of a scheduling device or a cell communication apparatus according to the present invention. The device/apparatus 100 can include, but is not limited to, a plurality of queues 110, a first cell output controller 112, a content addressable memory 114, a read time storage unit 116, a virtual time selector 118, a read period storage unit 120, a read time controller 122, a content addressable memory controller 124, a cell output instruction unit 126, and a second cell output controller 128.

What is claimed is:

1. A scheduling device comprising:
a plurality of queues for storing a plurality of incoming cells respectively, the plurality of queues being allotted a plurality of queues numbers respectively;
a first cell output controller for setting a read time for each of the plurality of cells stored in each of the plurality of queues individually, and giving instructions for cell output to each of the plurality of queues individually;
a content addressable memory for storing the read time of each of the plurality of cells and valid cell information indicating presence or absence of each of the plurality of cells in the respective queue, addresses being defined in the content addressable memory in connection with the plurality of queue numbers respectively;
a read time storage unit for storing a first read time of each of cells that have not been read at a second read time set by the first cell output controller when a particular cell has been read at the second read time upon instructions from the first cell output controller, and for storing read time comparison condition representing presence/ absence of other cells that should have been read at the same time as the second read time;
a virtual time selector for utilizing the first read time as a virtual time and the read time comparison condition as virtual time comparison condition if the first read time is stored in the read time storage unit, and for utilizing an actual time counting a cell input/output period as the virtual time if the first read time is not stored in the read time storage unit;
a read period storage unit for storing a read period having a periodic interval predetermined for each queue and a carry value obtained when calculating a next read time for each queue, the next read time for each queue being obtained upon updating the read time for each queue;
a read time controller for reading a first address of a cell outputtable upon supplying the actual time to the content addressable memory to obtain an actual time matching queue number, actual time data matching information and actual time multiple matching queue information on the basis of the first address and the valid cell information at the actual time, and reading a second address of a cell outputtable upon supplying the virtual time to the content addressable memory to obtain a virtual time matching queue number, virtual time data matching information and virtual time multiple matching queue information on the basis of the second address and the valid cell information at the virtual time, thereby updating the second read time and the read time comparison condition stored in the read time storage unit in accordance with the actual time matching queue number, actual time data matching information and actual time multiple matching queue information and the virtual time matching queue number, virtual time data matching information and virtual time multiple matching queue information, or updating the second read time and the read time comparison condition stored in the read time storage unit in accordance with the read period and carry value stored in the read period storage unit;
a content addressable memory controller for updating the read time of a first cell stored in the content addressable memory to the actual time if the queue for the first cell is vacant and available to store an incoming cell and the actual time is greater than the read time of the first cell stored in the content addressable memory, or for updating the read time and valid cell information of the first cell stored in the content addressable memory in accordance with the valid cell information of the first cell at the virtual time and the read period and carry value of the first cell stored in the read period storage unit, after the first cell output controller gives the cell output instructions at the virtual time;
a cell output instruction unit for preparing cell output instructions to be given to a queue if a queue number indicated by an address of a cell outputtable upon supplying the virtual time to the content addressable memory matches a queue number indicated by the address at the virtual time on the basis of the virtual time matching queue number; and a second cell output controller for giving the cell output instructions to the cell in accordance with the cell output instructions prepared by the cell output instruction unit.

2. The scheduling device according to claim 1 wherein if the actual time is different from the virtual time, and there is multiple matching at the virtual time and multiple matching also in the virtual time comparison condition, the read time controller updates the first read time of the read time storage unit to the virtual time and the read time comparison condition to a multiple matching condition.

3. The scheduling device according to claim 1 wherein if there is no multiple matching at the virtual time, the actual time is different from the virtual time and there is address matching at the actual time, the read time controller updates the read time stored in the read time storage unit to the actual time.

4. The scheduling device according to claim 3 wherein if there is multiple matching at the actual time, the read time comparison condition is updated to a multiple matching condition, whereas if there is no multiple matching at the actual time, the read time comparison condition is updated to a no multiple matching condition.

5. The scheduling device according to claim 1 wherein if the actual time is greater than the next read time obtained from the read period and carry value stored in the read period storage unit, and the actual time is different from the virtual time, the read time controller updates the read time stored in the read time storage unit to the next read time.

6. A cell communication apparatus comprising a scheduling device, wherein the scheduling device includes:

a plurality of queues for storing a plurality of incoming cells respectively, the plurality of queues being allotted a plurality of queues numbers respectively;

a first cell output controller for setting a read time for each of the plurality of cells stored in each of the plurality of queues individually, and giving instructions for cell output to each of the plurality of queues individually;

a content addressable memory for storing the read time of each of the plurality of cells and valid cell information indicating presence or absence of each of the plurality of cells in the respective queue, addresses being defined in the content addressable memory in connection with the plurality of queue numbers respectively;

a read time storage unit for storing a first read time of each of cells that have not been read at a second read time set by the first cell output controller when a particular cell has been read at the second read time upon instructions from the first cell output controller, and for storing read time comparison condition representing presence/absence of other cells that should have been read at the same time as the second read time;

a virtual time selector for utilizing the first read time as a virtual time and the read time comparison condition as virtual time comparison condition if the first read time is stored in the read time storage unit, and for utilizing an actual time counting a cell input/output period as the virtual time if the first read time is not stored in the read time storage unit;

a read period storage unit for storing a read period having a periodic interval predetermined for each queue and a carry value obtained when calculating a next read time for each queue, the next read time for each queue being obtained upon updating the read time for each queue;

a read time controller for reading a first address of a cell outputtable upon supplying the actual time to the content addressable memory to obtain an actual time matching queue number, actual time data matching information and actual time multiple matching queue information on the basis of the first address and the valid cell information at the actual time, and reading a second address of a cell outputtable upon supplying the virtual time to the content addressable memory to obtain a virtual time matching queue number, virtual time data matching information and virtual time multiple matching queue information on the basis of the second address and the valid cell information at the virtual time, thereby updating the second read time and the read time comparison condition stored in the read time storage unit in accordance with the actual time matching queue number, actual time data matching information and actual time multiple matching queue information and the virtual time matching queue number, virtual time data matching information and virtual time multiple matching queue information, or updating the second read time and the read time comparison condition stored in the read time storage unit in accordance with the read period and carry value stored in the read period storage unit;

a content addressable memory controller for updating the read time of a first cell stored in the content addressable memory to the actual time if the queue for the first cell is vacant and available to store an incoming cell and the actual time is greater than the read time of the first cell stored in the content addressable memory, or for updating the read time and valid cell information of the first cell stored in the content addressable memory in accordance with the valid cell information of the first cell at the virtual time and the read period and carry value of the first cell stored in the read period storage unit, after the first cell output controller gives the cell output instructions at the virtual time;

a cell output instruction unit for preparing cell output instructions to be given to a queue if a queue number indicated by an address of a cell outputtable upon supplying the virtual time to the content addressable memory matches a queue number indicated by the address at the virtual time on the basis of the virtual time matching queue number; and a second cell output controller for giving the cell output instructions to the cell in accordance with the cell output instructions prepared by the cell output instruction unit.

7. The cell communication apparatus according to claim 6 wherein if the actual time is different from the virtual time, and there is multiple matching at the virtual time and multiple matching also in the virtual time comparison condition, the read time controller updates the first read time of the read time storage unit to the virtual time and the read time comparison condition to a multiple matching condition.

8. The cell communication apparatus according to claim 6 wherein if there is no multiple matching at the virtual time, the actual time is different from the virtual time and there is address matching at the actual time, the read time controller updates the read time stored in the read time storage unit to the actual time.

9. The cell communication apparatus according to claim 8 wherein if there is multiple matching at the actual time, the read time comparison condition is updated to a multiple matching condition, whereas if there is no multiple matching at the actual time, the read time comparison condition is updated to a no multiple matching condition.

10. The cell communication apparatus according to claim 6 wherein if the actual time is greater than the next read time obtained from the read period and carry value stored in the read period storage unit, and the actual time is different from the virtual time, the read time controller updates the read time stored in the read time storage unit to the next read time.

* * * * *